United States Patent

Broadbent

[15] 3,670,312

[45] June 13, 1972

[54] WRITE STATION FOR A MAGNETIC STORAGE MEDIUM

[72] Inventor: Berne D. Broadbent, Orange, Calif.

[73] Assignee: Hughes Aircraft Company, Culver City, Calif.

[22] Filed: Oct. 30, 1970

[21] Appl. No.: 85,597

[52] U.S. Cl.............340/174 SR, 340/174 AC, 340/174 NA, 340/174 PW, 340/174 TF, 340/174 TW

[51] Int. Cl.................G11c 19/00, G11c 11/04, G11c 11/14

[58] Field of Search..............340/174 SR, 174 TW, 174 PW, 340/174 AC

[56] References Cited

UNITED STATES PATENTS

| | | | |
|---|---|---|---|
| 3,241,126 | 3/1966 | Snyder | 340/174 SR |
| 3,588,854 | 6/1971 | Lesher | 340/174 PW |
| 3,134,965 | 5/1964 | Meier | 340/174 TW |

*Primary Examiner*—James W. Moffitt
*Attorney*—James K. Haskell and Robert Thompson

[57] ABSTRACT

A magnetic shift register including a fine magnetic wire recording medium, the wire being wound under tension in a helix around a substrate including a cylindrically disposed polyphase advance array which includes a plurality of drive windings oriented transverse to the axis of the magnetic wire so that a series of spaced magnetic domains, sequentially formed at the input end segment of the magnetic wire by a drive field produced by one of the drive winding, can be propagated through the length of the magnetic wire by the polyphase advance array when current pulses are applied to the drive windings. A write winding fastened adjacent the magnetic wire toward the input end thereof can selectively impede propagation of and cause destruction of the magnetic domain in selected storage segments. A read winding disposed toward the output end of the magnetic wire senses magnetic domains propagated therethrough past the write winding such that the absence of a magnetic domain from a spaced storage segment of the magnetic wire represents a digital ZERO and the presence of a magnetic domain represents a digital ONE.

21 Claims, 5 Drawing Figures

INVENTOR.
BERNE D. BROADBENT,
BY
Robert Thompson
ATTORNEY.

WRITE STATION FOR A MAGNETIC STORAGE MEDIUM

BACKGROUND OF THE INVENTION

This invention relates generally to an improved magnetic storage device and more particularly to improvements in writing digital information in the form of magnetic domain on a magnetic medium, such as fine magnetic wire.

Heretofore, magnetic memory systems and shift registers have been constructed using magnetic wire wound under tensil stress in a helical manner around a cylindrical polyphase magnetic drive field arrangement on a substrate. In operation, a magnetic domain recorded on a segment of the wire has been advanced, or selectively propagated, by the polyphase drive field arrangement during a four phase timing cycle by selectively applying drive current pulses to the polyphase drive field arrangement. It is necessary for the magnetic medium to exhibit a differential between the domain wall motion threshold field $H_O$ (the field below which no domain wall motion can occur) and the nucleating threshold field $H_S$ where the drive field H is greater than the domain wall motion threshold field $H_O$ but less than the nucleating threshold field $H_S$. More specifically, the polyphase driving arrangement includes a plurality of drive windings each disposed parallel to one another about the cylindrical surface of a substrate and interconnected to produce a polyphase magnetic field which should be generally parallel to the axis of the wire. A reversed polarity magnetic domain relative to a reference polarity has been recorded on a segment thereof at a write station preferably near one end of the magnetic wire. This domain was then propagated along the magnetic wire by the polyphase drive field. A read winding located toward the other end of the magnetic wire produced an output signal representative of a digital ONE level when the magnetic domain was propagated past it along the wire and a ZERO level if a reference polarity magnetic domain was propagated past it.

Structurally, in the vicinity of a write station the magnetic medium was decreased in pitch to about 10 turns per inch for three turns to compensate for the wide magnetic fringe field associated with the write operation that can influence magnetic domains in adjacent turns of the magnetic medium. The magnetic medium was then terminated in a two or three turn salvage band at substantially ZERO pitch and fastened to the cylindrical substrate by an adhesive, such as epoxy resins. A small permanent magnet was fastened over a segment of the magnetic medium at about one-half a turn from the salvage band to magnetically bias the magnetic medium to a magnetic reference state or ZERO state by blocking the propagation of any magnetic domain that exists between the magnet and the salvage band. As a result, only digital ZEROS exist on the magnetic medium between the biasing magnet and a write winding.

A write head was positioned over a segment of the magnetic medium at a position between the biasing magnet and a memory portion of the magnetic medium. In operation, the write head was pulsed with electrical current to produce a magnetic field directly beneath it that exceeded the nucleating threshold field $H_S$ and favors formation of a reversed polarity magnetic domain to switch the magnetic state of the segment of magnetic medium directly below it to a reversed polarity digital ONE storage state. If the write head was not pulsed, no magnetic field was produced whereupon the segment of magnetic medium beneath it was left at a reference polarity or digital ZERO storage state.

Thereafter, the polyphase drive field propagated the magnetic domains toward the read station with the length of magnetic wire between the write station and the read station serving as the magnetic storage area.

The biasing magnet and write head were externally mounted units that had relatively broad magnetic fringe fields. Thus, difficulty was encountered in the interaction between the write head, the biasing magnetic, and adjacent turns of the magnetic medium. In addition, the biasing magnet had been subjected to alternating magnet drive fields of relatively low amplitude that caused gradual decay in the field strength of the bias magnet. Consequently, alignment of the write head and bias magnet would eventually have to be readjusted to compensate for change in the biasing field strength. Such alignment of the biasing magnet and readjustment thereof took a substantial amount of time. Furthermore, the biasing magnet would still eventually have to be replaced. Furthermore, the large surface area required for the wide pitch at the write station and salvage bands reduce the bit storage density per unit of area on the cylindrical substrate.

SUMMARY OF THE INVENTION

Objectives of this invention can be attained with the provision of a magnetic storage medium, such as a fine magnetic wire disposed in the helix around a cylindrical polyphase drive field array for propagating magnetic domains. Digital ZERO storage states can be effectively written on the magnetic medium by a write station having the separate features of a small amount of write station area on the cylindrical array surface with the input end of the magnetic medium being abruptly terminated centrally on a drive winding electrode so that the drive field, in effect, aids in the formation of reversed polarity magnetic domains at the endmost segment of the magnetic medium. These magnetic domains are propagated down the magnetic medium by the drive field array wherein a write head, when subjected to a write current pulse, produces a magnetic field that opposes propagation of leading walls of the domains past it to thereby impede domain wall propagation at selected storage segments of the magnetic medium causing the self-demagnetizing effects of the magnetic domain to destroy itself. This effectively returns the magnetic state of that storage segment to its reference polarity to effectively write a digital ZERO on that storage segment. For a digital ONE storage condition, the write head is not pulsed whereupon the absence of an opposing magnetic field enables the magnetic domain to be propagated past the write head in an unimpeded manner as a digital ONE storage state on that storage segment of the magnetic wire.

Numerous advantages of this technique include: the elimination of the biasing magnet thereby eliminating the problem of gradual decay in the magnet strength and the need for readjustment or replacement at some future time; the reference state within the magnetic medium is now provided by natural physical phenomena and domain walls are reliably inserted at every storage bit position at the input end of the magnetic media; the area of the substrate required for the write station and termination of the wires is significantly reduced relative to the prior art technique thus providing increased bit capacity for a given substrate area and magnetic medium length; and the time required for write head alignment has been significantly reduced because of the elimination of the biasing magnet and the interaction that many times existed between the fringing field from the biasing magnet and those of the write head.

BRIEF DESCRIPTION OF THE DRAWINGS

Other objectives, features, and advantages of this invention will become apparent upon reading the following detailed description and referring to the accompanying drawings in which.

DESCRIPTION OF THE PREFERRED EMBODIMENT

Figure 1:
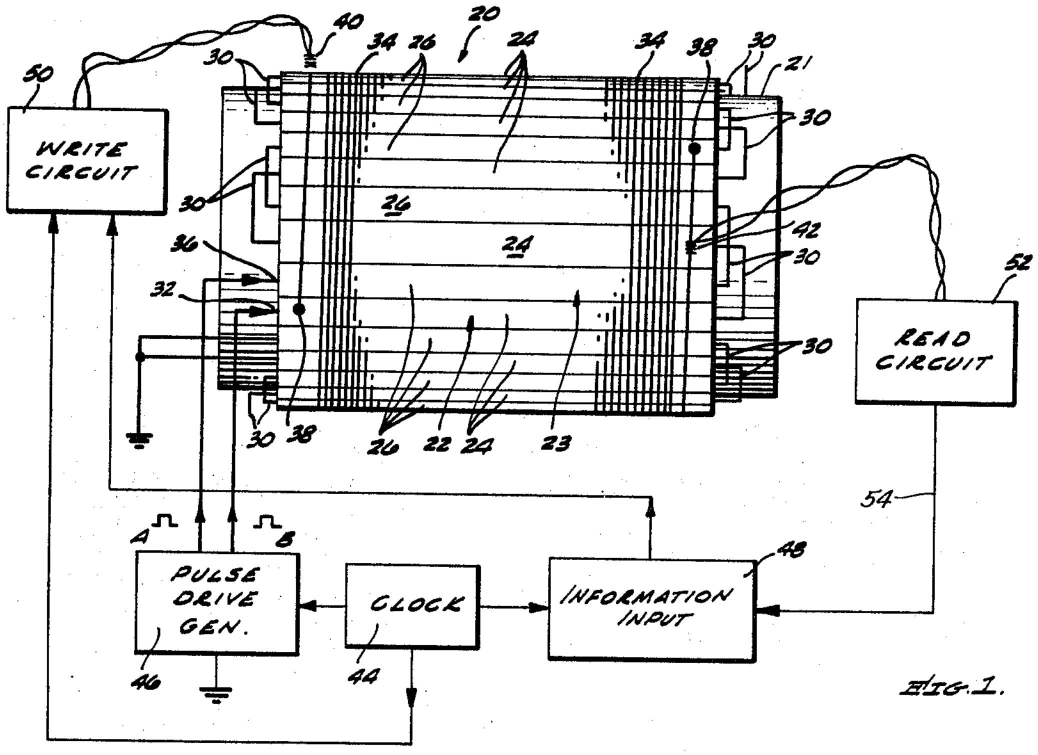
FIG. 1 is a schematic illustration of a cylindrical array magnetic shift register storage device and associated electronics and includes a magnetic wire which is wound in a helix around drive windings and a write station.

A large capacity magnetic shift register 20 which can be constructed in a cylindrical array utilizing the features of the invention is illustrated schematically in FIG. 1—which is not drawn to scale. Specifically, the shift register 20 includes a cylindrical substrate member 21 of dielectric material.

A polyphase drive winding comprises two drive windings 22 and 23 which are made up of a plurality of thin ribbon-like electrical conductors 24 and 26 which operate as propagating electrodes on drive conductors secured on the cylindrical dielectric surface and arranged in spaced-apart parallel relationship to one another coaxial with the axis of the cylindrical substrate member 21.

Every other one of the ribbon-like drive conductors 24, which comprise every alternate drive conductor in the cylindrical array, are interconnected in series circuit relationship with one another by end straps 30 secured in electrical contact with each end of a drive conductor to form one drive winding 22. A current pulse B applied to the input terminal 32 of the drive winding 22 traverses back and forth across the surface of the cylindrical substrate member 21 through the individual drive conductors or electrodes 24 to generate every other segment of a polyphase drive field until it is conducted to ground at the end of the last conductor 24 of the first alternate set of drive conductors 22. As will be pointed out subsequently, these alternate drive field segments alternately oppose and favor the existence of a reversed polarity magnetic domain stored on a superposed or adjacent segment of a magnetic medium 34.

The other alternate set of drive conductors on electrodes 26 are also interconnected in series circuit relationship with one another at their ends by means of end straps 36 to form the drive winding 23. Current pulses A applied to an input terminal 36 at one end of drive winding 23 traverses back and forth across the surface of the cylindrical substrate member 21 through the individual drive conductors 26 to produce every other one of the polyphase magnetic drive field segments which alternately oppose and favor the existence of the magnetic domains until the current pulse A is conducted to ground at the end of the last drive conductor 26 in the set of electrical conductors forming the second drive windings 23.

In order to have continuity of the polyphase drive field produced by the two sets of drive windings 22 and 23 throughout any 360° of the cylindrical array it is necessary that the number of individual drive conductors 24 and 26 be a multiple of four. The drive conductor is electrically isolated by a thin layer of dielectric material such as polyurethane.

The magnetic medium 34 which can be a fine permaloy wire including, for example, vanadium, cobalt, and iron, is wound in a tight pitched helix about the cylindrical substrate 21 starting at a point beyond its output end traversing the individual drive conductors 24 and 26 in the drive windings 22 and 23 under a tensil stress at a preselected tension. As the winding progresses and approaches a write station or write area on the substrate, the winding pitch is decreased to 10 turns per inch starting at one turn before the write station. After the wire crosses the write station, it continues on for approximately one-quarter of a turn. At this point, the wire is abruptly terminated and fastened to the substrate surface with an adhesive 38 such as a sealing wax. The magnetic wire is cut off sharply at the edge of the point at which it is fastened over the drive winding on substrate surfaces so that the end is preferably substantially planar and at a right angle to the axis of the wire. Of course it is not necessary that the end of the wire be planar or at a right angle as long as the wire ends abruptly. The terminating point of the magnetic wire should fall at or near the center portion of one of the drive conductors 24 or 26 for reasons to be explained in more detail subsequently. It should be pointed out that the output ends of the magnetic wire 34 is also secure to the substrate 21 by means of a sealing wax adhesive 38 of the type previously referred to.

As will be explained in more detail subsequently, a write head 40 is superposed over the magnetic wire 34 at a write station and operably impedes or biases the propagation of reversed polarity magnetic domains formed at the input end of the magnetic wire 34 by the effects of the drive field H produced by the drive conductor 24 or 26 which it terminates upon. As a result, domains are selectively propagated to the output ends of the magnetic medium 34 to be read by a read winding 42 secured about it in magnetic coupling therewith.

Electronics for operating this shift register 20 can include a clock pulse generator 44 which is coupled to a drive pulse generator 46. The drive pulse generator 46 is responsive to the clock pulses and generates the A phase drive current pulse signal which is fed on one line to the input terminal 36 of the shift register 20 and the B phase drive current pulse signal which is fed on a second line to the input terminal 32. In addition, the output of the clock pulse generator 44 is fed to synchronize the information input unit 48 to synchronize the operation of a write circuit 50. Thus, information pulse signals from the information input unit 48 are fed to one input of the write circuit 50 so that a write ZERO pulse is fed to the write head 40 only when a clock pulse enables the write circuit 50 in synchronism with the polyphase drive field. The magnetic field produced by the write head 40 magnetically opposes or otherwise impedes propagation of the magnetic domains beyond the write station. A digital ONE is stored on a storage segment of the magnetic wire 34 by not feeding a current pulse to the write head 40 from the write circuit 50 during a designated time interval. Consequently, the magnetic domain is propagated past the write head 40 and can eventually be propagated to the read winding 42.

Thereafter, this magnetic domain is shifted around the shift register 20 until it is propagated through the read winding 42 where it induces an output signal by means of its magnetic coupling which is detected by a read circuit electronics 52. If it is desired to recirculate the digital information rather than destructively read it out, a recirculating loop, including a feedback line 54, is connected from the output of the read circuit 52 to an input terminal of the information input unit 48 whereupon the read out information can be rewritten into the shift register 20 in its proper timing sequence.

As will be explained in more detail subsequently, the writing of a digital ZERO storage condition can occur at selected times during the equally spaced times between $t_0$ through $t_n$ where $n$ is representative of a number of equally spaced time intervals when the A phase or the B phase drive pulses change state. By impeding propagation of the leading wall of a reversed polarity magnetic domain, the self-demagnetizing effect of the trailing wall as it is propagated toward the stopped leading wall causes self destruction at the magnetic domain.

Figures 2, 3:
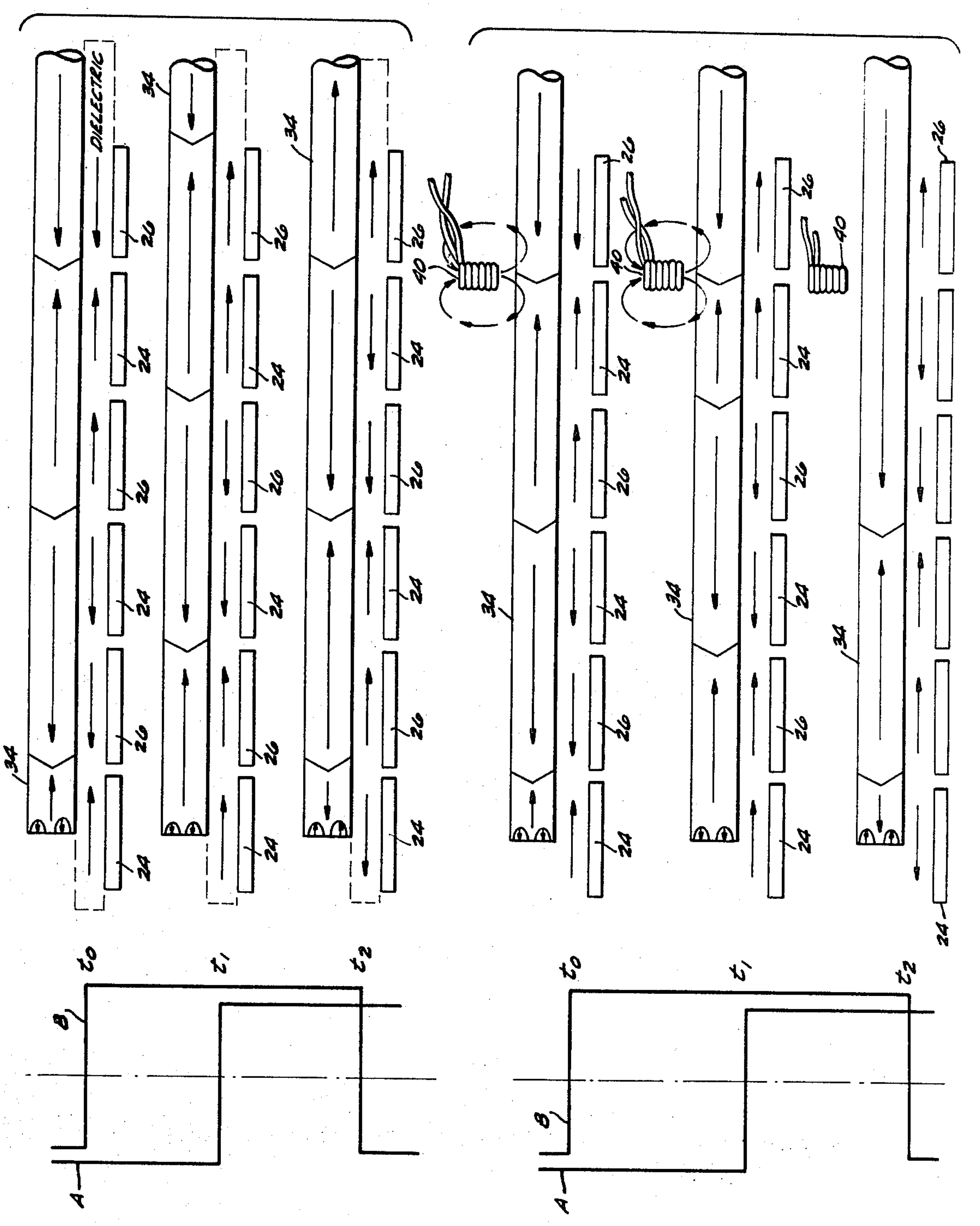
FIG. 2 is a time-space graph illustrating the drive field effects in writing spaced reversed polarity magnetic domains at the end of the magnetic wire.
FIG. 3 is a time-space graph illustrating the effects of the magnetic drive field produced by drive windings and a write ZERO bias field produced by a write head on propagating magnetic domains.

Referring now to the timing space diagrams of FIG. 2 there is illustrated a magnetic wire 34 which operably has magnetic domains sequentially formed at its terminated input end by the effects of a drive field H produced by the drive conductor 24 which it terminates over. This magnetic medium is characterized by being highly magnetically oriented in the longitudinal direction and exhibits a difference between the nucleating threshold field $H_S$ (the magnetic field energy required to create a reversed polarity magnetic domain) and the domain wall motion threshold field $H_O$ (the field energy required to make a domain wall motion occur in the longitudinal direction). When such a magnetic medium exhibits a differential in its threshold field characteristics, an external magnetic field applied to its input end tends to switch the magnetic medium from a reference magnetic polarity to an opposite magnetic polarity through the formation of small reversed nucleus at the abruptly terminated end. The reversed nucleus then grows by propagational switching to the extremities of the magnetic field which initiates and favors the switching action.

The operation of the domain formation on the magnetic wire 34 can be best explained with references to the space-time diagram of FIG. 2. In this diagram, the abscissa is representative of: the individual propagating or drive conductor 24 and 26; and the domains formed on and propagated along the magnetic wire 34 whereon the cylindrical configuration is graphically represented as being linear. The ordinate is representative of the timing of drive pulses A and B fed to the two sets of drive windings 22 and 23 during the time periods $t_0$, $t_1$, and $t_2$. The arrows between the drive windings 24 and 26 and the magnetic wire 34 are representative of the magnetic polarity of segments of the polyphase magnetic drive field applied to the magnetic wire 34 during each sequential phase of the input pulse signals A and B. Those drive field segments that are oriented in the same direction as the magnetic domain field will favor the existence of a magnetic domain and those magnetic field segment arrowheads that are oriented opposite direction of the magnetic domain field oppose the formation and spreading of a magnetic domain beyond the segment of the wire superposed over a maximum of two drive field segments. It can be seen from this diagram that the polyphase drive field pattern appears to step or advance one drive winding width to the right during each sequential phase of the input pulses A and B.

Considering the end of the magnetic wire 34, the following structural and magnetic conditions exist. First of all, the wire is terminated abruptly, ideally but not necessarily in a plane substantially normal to the axis of the wire. As a result of this abrupt termination of the magnetic wire, there are no closed magnetic pads for the atomic moments of the magnetic media at the end of the magnetic wire. Since these atomic moments tend to align themselves in such a direction as to provide a minimum energy state, many of the magnetic lines of force leave the material and turn abruptly and close or return to the material forming magnetic fields, referred to as "self-demagnetizing fields," which tend to oppose the direction of those atomic moments that generated them. This condition is illustrated schematically in FIG. 2 by the axially oriented small arrows extending to and from the end of the magnetic media 34.

These self-demagnetizing fields are of such a magnitude that they reverse the magnetization of small regions of the magnetic material at the end of the wire. These small regions are referred to as a reversed nucleus. Since these reversed nucleus are always present at the end of the wire due to the self-demagnetizing fields regardless of the direction or polarity of magnetization of the wire, they are capable of continually generating alternate magnetic domain in the magnetic wire 34 as the drive fields alternate between the two magnetic directions—one of which favors the existence of reversed polarity magnetic domain and the other of which opposes the existence of a reversed polarity magnetic domain.

As the drive windings 24 and 26 are pulsed by the drive pulses A and B a series of reversed polarity magnetic domains are produced at the end of the magnetic wire 34 and are propagated on down the length of the wire. For example, during the time period $t_0$–$t_1$ the drive conductor 24, which has the end of the magnetic wire 34 terminated centrally above it, produces a magnetic drive field segment having a field direction that favors the existence and growth of a reversed polarity magnetic domain. The adjacent drive conductor 26 produces a magnetic drive field segment having a direction that opposes the growth of the reversed polarity magnetic domain and favors the existence of the reference polarity magnetic state of the magnetic medium 34. Consequently, the reversed polarity magnetic domain formed at the end of the magnetic wire 34 spreads or grows to the extremities of the magnetic drive field segment that favors its existence as a reverse polarity magnetic domain.

Starting at the time $t_1$, the drive pulse B goes to a state such that when the current is fed through each drive conductor 26 that drive conductor 26 adjacent the first drive windings 24 relative to the end of the magnetic wire 34 produces a magnetic drive field segment that also favors the spreading of the magnetic domain formed at the end of the wire. As a result, the reversed polarity magnetic domain grows by propagational switching to the extremities of the field pattern that favors its existence. Further growth beyond this segment of magnetic wire is prohibited by the opposing magnetic drive field segment produced by the next sequential drive conductor 24.

Starting at the time $t_2$, the drive pulse A applied to the drive conductor 24 changes state so that the direction of the magnetic drive field segments produced by the drive conductors 24 are reversed relative to their direction at time $t_1$. Since the magnetic drive field segment produced by the first drive conductor 24 which has the end of the magnetic wire 34 terminated about it, opposes the formation of reversed polarity magnetic domains, the trailing edge of the magnetic domain is propagated axially and a reference polarity magnetic domain is formed at the end of the magnetic wire 34. The leading edge of the previously formed magnetic domain is also propagated down the magnetic wire 34 to that segment superposed over the two adjacent drive conductors 24 and 26 that produce the two magnetic drive field segments that favor the existence of the reversed polarity magnetic domain. That drive conductor 26 adjacent this segment produces a magnetic field that opposes the growth of the reversed polarity magnetic domain, thus stopping spread of the domain.

By thus alternately forming the reversed polarity magnetic domain on alternate segments of the magnetic wire 34 and by then prohibiting the growth of reversed polarity magnetic domain by favoring the existence of the reference polarity magnetization in alternate segments of the magnetic wire 34, a reference or guard segment of magnetic medium is maintained between adjacent stored reversed polarity magnetic domain at storage location. This is best illustrated by the segments of magnetic medium located between the already formed reversed polarity magnetic domains and the then forming reversed polarity domain at the time $t_0$ in FIG. 2. Thus, a series of digital ONES storage states are produced at the end of the magnetic wire at each bit storage segment and are propagated down the wire to a write station. If the propagation were to continue, every storage location on the magnetic wire would have a digital ONE stored in it until the entire storage capacity of the wire was filled with a series of digital ONES.

To selectively produce the digital ONES and digital ZEROS at the storage locations on the magnetic wire, the write head 40 is positioned adjacent a segment of the magnetic wire, a number of drive conductor widths from the wire end. In operation, the write head 40 receives a current pulse at selected time intervals to generate a localized magnetic field having a direction that opposes the growth of reversed polarity magnetic domains thereby pinning or impeding the leading wall of the propagated magnetic domain that is trying to move past it. This then permits the trailing wall of the reversed polarity magnetic domain to be propagated toward the pinned leading wall. As the trailing wall approaches the leading wall, the self-demagnetizing field produced by the decreasing size of the magnetic domain, will increase to the point that the magnetic domain will destroy itself and be erased. Thus, since a reversed polarity digital ONE storage condition no longer exists at the storage position on the magnetic wire, a digital ZERO is effectively written into the storage location.

For a digital ONE storage condition, the write head 40 is not pulsed whereupon no magnetic field is produced which opposes the growth or propagation of the reversed polarity magnetic domains. Consequently, these magnetic domains are allowed to move uninhibited past the write head 40 whereupon the reversed polarity magnetic domain, representative of a digital ONE storage condition, is stored at the storage location.

Figure 5:
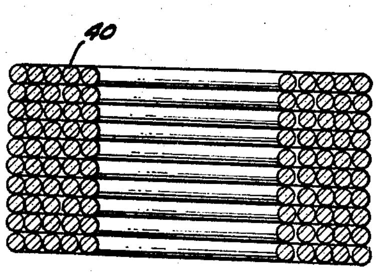
FIG. 5 is a cross-sectional view of the write head of FIG. 4.
Figure 4:
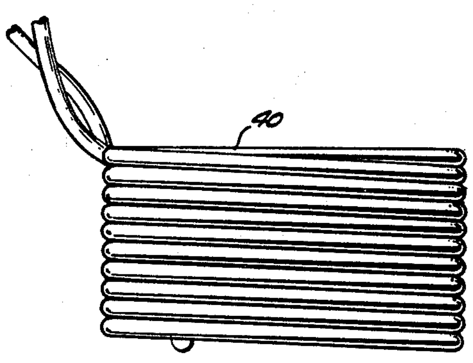
FIG. 4 is an elevation view illustrating the write head.

Structurally, the write head 40 illustrated in FIGS. 4 and 5 is a solenoid that includes a cylindrical winding body having a multiplicity of turns of insulated, fine, electrically conductive wire which is formed by winding the wire around a small mandrel. Although the size of the wire used and the diameter of the mandrel are dependent upon the size of the drive conductors 24 and the magnetic wire 34 for which the write head is being fabricated, a typical configuration could consist of 50 turns of number 48 dielectric coated wire wound around a 15 mil mandrel. The coil, as illustrated in cross-section in FIG. 5, consists of five layers of 10 turns each wound uniformly on the mandrel. The terminating ends of the wire are twisted together as they extend away from the body of the coil itself starting at a point close to the body of the coil. The write head 40 would then be removed from the mandrel and the coil impregnated with an epoxy resin or some other bonding cement to hold the coil rigidly in its cylindrical configuration. Utilizing this configuration, an exemplary completed coil would he a 15 mil cylindrical hole in its center, be approximately 15 mils high, and have a 30 mil diameter.

The write head 40 is placed over the magnetic wire 34 with its axis transverse to the axis of the magnetic wire preferably at a right angle or normal thereto. When the write coil 40 is pulsed with a current pulse in the proper sequence, it creates a magnetic field that, as it spreads out or diverges at the bottom of the coil, opposes the growth or existence of the reversed polarity magnetic domain. Consequently, the magnetic field opposes the forward propagation motion of the leading wall of the reversed polarity magnetic domain thus trapping the magnetic domain and not allowing it to propagate past the write station until the write current pulse has been removed from the write coil. With no write current pulse flowing in the write head 40, the domain wall of any reversed polarity magnetic domain may be propagated in an unobstructed manner past the write head 40 axially along the magnetic wire 34.

The placement of the write head 40 with respect to the drive windings 24 and 26 determines that position at which the write head will inhibit the motion of domain walls. Consequently, the small hole in the center of the write head 40 can be utilized to visually align the write head 40 at its proper position on the memory element without requiring extensive electrical testing and adjustment. Preferably, the write head 40 is positioned above and adjacent the magnetic wire 34 at a location superposed at or near the boundary between two adjacent drive winding conductors 24 and 26 so that a leading wall of reversed polarity magnetic domain will be caught by the write field. Of course, depending upon the timing of the write current pulse relative to the polyphase drive pulses A and B, the write head 40 could be superposed over other portions of the magnetic wire 34 relative to the individual drive winding conductors 24 and 26 as long as the bias field of the write winding does not allow the leading wall of the magnetic domain to slip too far under it to be caught when pulsed. The write head 40 is fastened to the shift register 20 by an adhesive such as epoxy resin with from no spacing from the magnetic wire 34 to 5 or 6 mils above it for a device constructed.

Advantages of this particular write head configuration are that: there is no ferrite core in the coil so it can be placed directly over the magnetic medium 34 without shunting any of the propagational fields necessary to allow normal domain motion thereby eliminating the occasional trapping of domains under the write head, if the write head is close to the memory media; the write head can be placed close to the magnetic media 34 thereby reducing the level of the required write current pulse and resulting fringe fields; the write head can be visually aligned over the magnetic wire 34 at a premarked position and no longer requires extensive adjustment or electrical testing to determine the optimum position for its location; and the write head 40 can be secured directly to the magnetic shift register assembly 20 by means of an adhesive such as an epoxy resin thereby eliminating the need for a mounting structure and an adjustment assembly.

While the salient features have been illustrated and described with respect to a particular embodiment, modifications can be made within the spirit and scope of the invention.

What I claim is:

1. In combination with a magnetic device of the type in which magnetic domains are propagated along a magnetic wire by a polyphase drive field having magnetic field segments produced by individual ones of a plurality of side-by-side spaced-apart drive conductors in response to polyphase drive field pulses, said drive field segments alternately having a first direction and a second direction axial to the axis of the magnetic wire wherein the improvement comprises:

a magnetic wire having an input end terminated centrally adjacent one of said drive conductors, said magnetic wire being operable to sequentially produce at said input end a magnetic domain of a reversed polarity relative to a reference polarity when the direction of the magnetic drive field segment produced by said adjacent drive conductor is in the first direction and to produce a magnetic domain of a reference polarity when the drive field segment is in the second direction, the drive field segments being further operable to propagate the magnetic domains axially on said magnetic wire; and a write head secured adjacent said magnetic wire at a position displaced axially from said input end and being responsive to selectively receive current signals for magnetically biasing the leading wall of the reversed polarity magnetic domains against propagation axially along said magnetic wire until the self-demagnetizing effects of the propagating trailing wall of the reversed polarity magnetic domain effects self-demagnetizing destruction of the reversed polarity magnetic domain to the reference polarity.

2. The combination of claim 1 in which said input end of said magnetic wire is terminated at about the center of said drive conductor.

3. The combination with a magnetic device of claim 1 in which said input end of said magnetic wire is terminated in a substantial plane transverse to the axis of the wire.

4. In the combination of claim 1 wherein said write head is axially displaced a small number of drive conductor widths having a total width less than one turn of said magnetic wire from the said input end.

5. In the combination of claim 1 wherein said drive conductors are in a cylindrical configuration and said magnetic wire is disposed about said drive winding in a helix with the pitch of the helix being greater than the pitch of a storage length of magnetic wire for not more than about one turn at the end of said magnetic wire associated with said input end.

6. In combination with the magnetic device of claim 1 wherein said input end is abruptly terminated over the central half of a drive conductor.

7. The combination with a magnetic device of claim 6 wherein said write head is a solenoid secured adjacent said magnetic wire with its axis transverse to the axis of said magnetic wire at a position displaced from said input end.

8. The combination with a magnetic device of claim 1 wherein said write head is a solenoid secured adjacent said magnetic wire with its axis transverse to the axis of said magnetic wire at a position displaced from said input end.

9. The combination with a magnetic device of claim 8 wherein the axis of said solenoid is at a position substantially at the interspace between adjacent drive conductors.

10. In combination with a magnetic device of claim 8 wherein said solenoid is secured adjacent to and in close proximity to said magnetic wire by adhesive.

11. In the combination of claim 8 wherein said drive conductors are in a cylindrical configuration and said magnetic wire is disposed about said drive winding in a helix with the pitch of the helix being greater than the pitch of a storage length of magnetic wire for not more than about one turn at the end of said magnetic wire associated with said input end.

12. In the combination of claim 8 wherein said write head is axially displaced a small number of drive conductor widths having a total width less than one turn of said magnetic wire from the said input end.

13. In the combination of claim 12 wherein said drive conductors are in a cylindrical configuration and said magnetic wire is disposed about said drive winding in a helix with the pitch of the helix being greater than the pitch of a storage length of magnetic wire for not more than about one turn at the end of said magnetic wire associated with said input end.

14. A method of writing digital information on a magnetic wire comprising the steps of:

applying a magnetic drive field segment of a first direction to an end of the magnetic wire for producing a magnetic domain at the end of the magnetic wire;

applying a series of polyphase magnetic drive field segments to the magnetic wire for propagating the magnetic domains therealong; and applying a magnetic bias field to the magnetic wire for stopping propagation of the leading wall of the magnetic domains, the polyphase magnetic drive field segments propagating the tailing wall of the magnetic domain toward the stop leading wall to self-demagnetize the magnetic domain for self-destruction thereof.

15. A write head of the type to be used with a magnetic storage device including an elongate magnetic medium operably having magnetic domains of a reversed polarity separated by magnetic magnetized segments of a reference polarity recorded thereon and spaced apart drive windings for producing a drive field parallel to the axis of the magnetic medium and magnetically coupled to propagate the magnetic domains axially therealong wherein the improvement comprises:

an air core solenoid comprising a plurality of turns of electrical conductor disposed about a hollow aperture, the longitudinal axis of said solenoid passing longitudinally through said aperture and being disposed transverse to the longitudinal axis of said magnetic medium, said solenoid being operable to receive a current pulse for producing a magnetic bias field having a direction and strength operable to stop propagation of the leading wall of reversed polarity magnetic domains, and said solenoid producing no magnetic field in the absence of a current pulse; and adhesive means for fastening said solenoid adjacent the magnetic medium in magnetic field coupled relation thereto with the axis of the solenoid transverse to the axis of said magnetic medium at a location displaced along the medium axis from one end of said magnetic medium at a position to selectively bias the leading wall of a reversed polarity magnet domains against propagation.

16. The write head of claim 15 in which said adhesive means operably fastens said solenoid adjacent the magnetic medium at a position at the interspace between two of the spaced apart drive windings.

17. The write head of claim 15 in which one end of said solenoid is fastened adjacent to, and in close proximity to, said magnetic medium.

18. The write head of claim 15 in which said solenoid is a multiturn, multilayer cylindrical coil disposed about a hollow cylindrical aperture.

19. The write head of claim 18 in which said multiturn, multilayer cylindrical coil is bonded together by a bonding agent to maintain its cylindrical configuration.

20. The write head of claim 18 in which said multiturn, multilayer cylindrical coil is bonded together by an epoxy resin and said adhesive means is an epoxy resin.

21. The write head of claim 18 in which said solenoid further includes terminating leads being twisted together to reduce stray magnetic coupling therewith.

* * * * *